US012251713B2

(12) United States Patent
Feng et al.

(10) Patent No.: US 12,251,713 B2
(45) Date of Patent: Mar. 18, 2025

(54) METHOD FOR FROTH-CONTROLLED FLOTATION OF ARGILLACEOUS LEPIDOLITE ORE

(71) Applicant: Kunming University of Science and Technology, Kunming (CN)

(72) Inventors: Qicheng Feng, Kunming (CN); Guang Han, Kunming (CN); Qian Zhang, Kunming (CN); Shuming Wen, Kunming (CN); Dianwen Liu, Kunming (CN); Wenjuan Zhao, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 18/782,638

(22) Filed: Jul. 24, 2024

(65) Prior Publication Data

US 2025/0050354 A1 Feb. 13, 2025

(30) Foreign Application Priority Data

Aug. 10, 2023 (CN) ......................... 202311003505.9

(51) Int. Cl.
*B03D 1/02* (2006.01)
*B03D 1/004* (2006.01)
*B03D 1/08* (2006.01)
*C22B 26/12* (2006.01)

(52) U.S. Cl.
CPC ............... *B03D 1/02* (2013.01); *B03D 1/004* (2013.01); *B03D 1/082* (2013.01); *C22B 26/12* (2013.01)

(58) Field of Classification Search
None
See application file for complete search history.

(56) References Cited

U.S. PATENT DOCUMENTS

2003/0146135 A1 * 8/2003 Gathje ..................... B03D 1/02 209/166
2004/0081603 A1 * 4/2004 Bittencourt .............. B03D 1/02 423/326
2024/0100545 A1 * 3/2024 Chester .................. B03D 1/008

* cited by examiner

*Primary Examiner* — Peter Keyworth
(74) *Attorney, Agent, or Firm* — Kirk A. Wilson; Joseph T. Guy; Patent Filing Specialist Inc.

(57) ABSTRACT

A method for froth-controlled flotation of argillaceous lepidolite ore, including: crushing and grinding an ore, adding water to obtain pulp; adding agents thereto, and conducting roughing to obtain roughing concentrate and roughing tailing; adding agents to the roughing tailing, and conducting first scavenging to obtain first scavenging concentrate and first scavenging tailing; subjecting the first scavenging tailing to second scavenging to obtain second scavenging concentrate and second scavenging tailing; adding agents to the roughing concentrate, conducting first cleaning to obtain first cleaning concentrate and first cleaning tailing; subjecting the first cleaning concentrate to second cleaning to obtain lithium concentrate I and second cleaning tailing; combining the first scavenging concentrate, second scavenging concentrate, first cleaning tailing, and second cleaning tailing to obtain lithium-containing mixed middling, adding agents thereto, and conducting cleaning-scavenging to obtain lithium concentrate II and cleaning-scavenging tailing; and combining the lithium concentrate I and lithium the concentrate II.

7 Claims, 1 Drawing Sheet

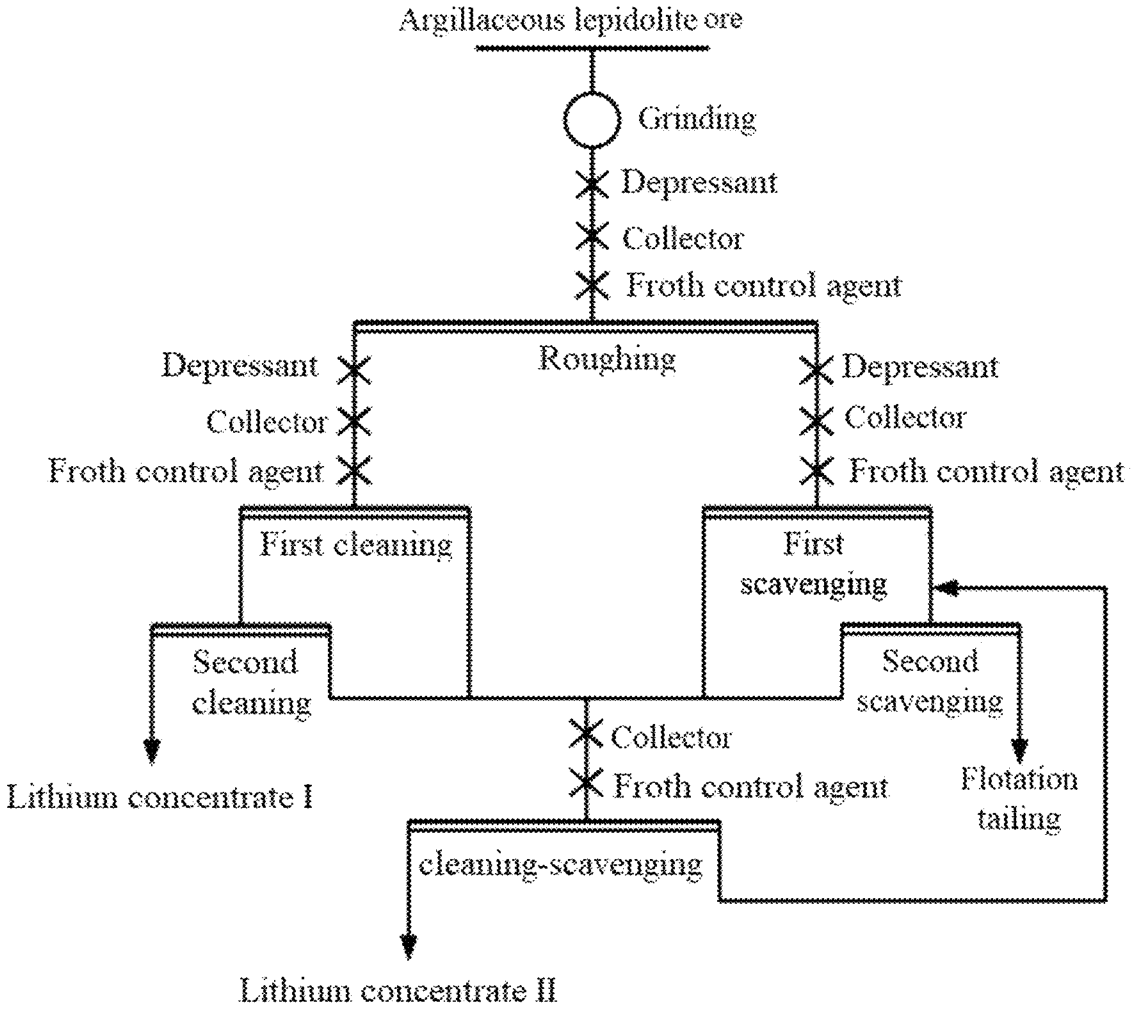
Argillaceous lepidolite ore
Grinding
Depressant
Collector
Froth control agent
Roughing
Depressant
Collector
Froth control agent
Depressant
Collector
Froth control agent
First cleaning
First scavenging
Second cleaning
Second scavenging
Collector
Froth control agent
Lithium concentrate I
Flotation tailing
cleaning-scavenging
Lithium concentrate II

METHOD FOR FROTH-CONTROLLED FLOTATION OF ARGILLACEOUS LEPIDOLITE ORE

CROSS REFERENCE TO RELATED APPLICATION

This application claims the benefit and priority of Chinese Patent Application No. 2023110035059 filed with the China National Intellectual Property Administration on Aug. 10, 2023, the disclosure of which is incorporated by reference herein in its entirety as part of the present application.

TECHNICAL FIELD

The present disclosure relates to a method for froth-controlled flotation of argillaceous lepidolite ore, and belongs to the technical field of mineral processing.

BACKGROUND

Lepidolite is an important strategic mineral resource, and often associated with gangue minerals such as feldspar and quartz. Since these minerals all are silicate minerals with similar surface properties, when an amine agent is adopted as a collector for flotation separation, a strongly-acidic medium is required to allow a prominent separation effect. However, when the production is conducted in a strongly-acidic environment, various equipment need to meet high anti-corrosion requirements and require a large investment and a high maintenance cost, and there are problems such as potential safety hazards, poor working environments, and high backwater treatment costs.

Lepidolite deposits have problems such as serious weathering, high erosion, and large argillation, resulting in a high content of primary slime in lepidolite ore, and a certain amount of secondary slime would be produced during processes such as mining, transportation, crushing, and grinding. The primary slime and the secondary slime both would adhere to surfaces of various minerals in the ore indiscriminately, such that the surfaces of lepidolite and gangue minerals are homogenized by such slimes, which seriously affects a separation effect. The presence of such slimes in an amine collector system would lead to problems such as over-stable flotation froths with a high viscosity, thick froth layers with a poor fluidity, a large froth amount with a serious phenomenon "foam overflow". In addition, during the conventional flotation process, slimes will be continuously accumulated and circulated, which further deteriorates an enrichment effect and a separation efficiency for lepidolite and thus makes it difficult to control a flotation process and proceed the production.

SUMMARY

In view of the technical problems such as over-stable flotation froths with a high viscosity, thick froth layers with a poor fluidity, a large froth amount with a serious phenomenon "foam overflow", and undesirable lithium ore flotation indexes, which are caused by the deterioration of a production process due to slimes in argillaceous lepidolite ore, the present disclosure provides a method for froth-controlled flotation of argillaceous lepidolite ore. The method could eliminate the adverse effects of slimes for lepidolite flotation by a dual-control of the flotation process for argillaceous lepidolite ore involving developments of a froth control agent and innovations of the process, such that a resulting concentrate froth is breakable and easy to be defoamed, and the problems of froth control and slime depression in the flotation of argillaceous lepidolite ore could be solved, improving a support capacity for lithium resources.

A method for froth-controlled flotation of argillaceous lepidolite ore is provided, including the following steps:

(1) crushing and grinding a lepidolite ore until a lepidolite monomer is dissociated, and adding water to obtain a pulp having a concentration of 29% to 37% by mass;

(2) adding a depressant, a collector, and a froth control agent in sequence to the pulp obtained in step (1), and conducting roughing to obtain a roughing concentrate and a roughing tailing;

(3) adding the depressant, the collector, and the froth control agent in sequence to the roughing tailing obtained in step (2), and conducting first scavenging to obtain a first scavenging concentrate and a first scavenging tailing;

(4) subjecting the first scavenging tailing obtained in step (3) to second scavenging to obtain a second scavenging concentrate and a second scavenging tailing, the second scavenging tailing being a flotation tailing;

(5) adding the depressant, the collector, and the froth control agent in sequence to the roughing concentrate obtained in step (2), and conducting first cleaning to obtain a first cleaning concentrate and a first cleaning tailing;

(6) subjecting the first cleaning concentrate obtained in step (5) to second cleaning to obtain lithium concentrate I and a second cleaning tailing;

(7) combining the first scavenging concentrate obtained in step (3), the second scavenging concentrate obtained in step (4), the first cleaning tailing obtained in step (5), and the second cleaning tailing obtained in step (6) to obtain a lithium-containing mixed middling, adding the collector and the froth control agent in sequence to the lithium-containing mixed middling, and conducting cleaning-scavenging to obtain lithium concentrate II and a cleaning-scavenging tailing, where the cleaning-scavenging tailing is recycled to the second scavenging in step (4); and (8) combining the lithium concentrate I obtained in step (6) and the lithium concentrate II obtained in step (7) to obtain a lithium concentrate product, where the depressant is a mixture of sodium carbonate and sodium silicate, the collector is a mixture of laurylamine, sodium lauryl sulfonate, and ethanol, and the froth control agent is a mixture of diesel oil, a polyether, and tributyl phosphate.

In some embodiments, in step (1), a mass percentage content of $Li_2O$ in the argillaceous lepidolite ore is in a range of 0.38% to 0.74%.

In some embodiments, in terms of each ton of the argillaceous lepidolite ore, 550 g to 850 g of the depressant, 360 g to 520 g of the collector, and 180 g to 260 g of the froth control agent are added for conducting the roughing in step (2).

In some embodiments, in terms of each ton of the argillaceous lepidolite ore, 250 g to 350 g of the depressant, 90 g to 130 g of the collector, and 45 g to 65 g of the froth control agent are added for conducting the first scavenging in step (3).

In some embodiments, in terms of each ton of the argillaceous lepidolite ore, 150 g to 250 g of the depressant, 55 g to 85 g of the collector, and 60 g to 80 g of the froth control agent are added for conducting the first cleaning in step (5).

In some embodiments, in terms of each ton of the argillaceous lepidolite ore, 40 g to 60 g of the collector and 50 g to 70 g of the froth control agent are added for conducting the cleaning-scavenging in step (7).

In some embodiments, taking a mass of the depressant as 100%, the sodium carbonate accounts for 55% to 65% and the water glass accounts for 35% to 45%;

tacking a mass of the collector as 100%, the laurylamine accounts for 30% to 40%, the sodium lauryl sulfonate accounts for 25% to 35%, and the ethanol accounts for 30% to 40%; and tacking a mass of the froth control agent as 100%, the diesel oil accounts for 45% to 55%, the polyether accounts for 25% to 35%, and the tributyl phosphate accounts for 15% to 25%.

The present disclosure has the following beneficial effects:

(1) In the present disclosure, the stability, fluidity, and viscosity of a flotation froth layer for argillaceous lepidolite ore could be adjusted by the froth control agent to change a thickness of a liquid film, making a lithium concentrate froth breakable and easy to be defoamed, thereby enhancing the enrichment effect and separation efficiency for lepidolite and solving the froth control problem during a flotation process of argillaceous lepidolite ore.

(2) In the present disclosure, the cleaning-scavenging is used for centralized treatment of the lithium-containing middling produced during the cleaning and scavenging, without being recycled to the roughing and cleaning, thereby eliminating the accumulation of slimes during the roughing and cleaning and avoiding the deterioration of concentrate indexes caused by slimes. The production process is improved by innovation of the flotation process, which solves the slime inhibition problem during the flotation process of argillaceous lepidolite ore.

(3) In the present disclosure, it is possible to solve the technical problems such as an over-stable flotation froth with a high viscosity, a thick froth layer with poor fluidity, a large froth amount with a serious phenomenon “foam overflow”, and undesirable lithium ore flotation indexes that are caused by the deterioration of the production process due to slimes in argillaceous lepidolite ore, allowing the efficient froth-controlled flotation recovery of argillaceous lepidolite ore.

BRIEF DESCRIPTION OF THE DRAWING

FIGURE is a process flow chart according to an embodiment of the present disclosure.

DETAILED DESCRIPTION OF THE EMBODIMENTS

The present disclosure will be further described in detail below in conjunction with specific examples, but the scope of the present disclosure is not limited thereto.

In the following examples of the present disclosure, a depressant is a mixture of sodium carbonate and sodium silicate, a collector is a mixture of laurylamine, sodium lauryl sulfonate, and ethanol, and a froth control agent is a mixture of diesel oil, a polyether, and tributyl phosphate.

Example 1

In this example, tacking a mass of the depressant as 100%, the sodium carbonate accounted for 55% and the sodium silicate accounted for 45%; tacking a mass of the collector as 100%, the laurylamine accounted for 30%, the sodium lauryl sulfonate accounted for 30%, and the ethanol accounted for 40%; and tacking a mass of the froth control agent as 100%, the diesel oil accounted for 45%, the polyether accounted for 35%, and the tributyl phosphate accounted for 20%.

As shown in FIGURE, a method for froth-controlled flotation of argillaceous lepidolite ore was performed as follows:

(1) The argillaceous lepidolite ore was crushed and ground until a lepidolite monomer was dissociated, and water was then added thereto to obtain a pulp with a concentration of 29% by mass, where a mass percentage content of $Li_2O$ in the argillaceous lepidolite ore was 0.38%.

(2) The depressant, the collector, and the froth control agent were added in sequence to the pulp obtained in step (1), and a resulting pulp mixture was subjected to roughing to obtain a roughing concentrate and a roughing tailing, where in terms of each ton of the argillaceous lepidolite ore, 550 g of the depressant, 360 g of the collector, and 180 g of the froth control agent were added to the pulp for the roughing.

(3) The depressant, the collector, and the froth control agent were added in sequence to the roughing tailing obtained in step (2), and a resulting mixture was subjected to first scavenging to obtain a first scavenging concentrate and a first scavenging tailing, where in terms of each ton of the argillaceous lepidolite ore, 250 g of the depressant, 90 g of the collector, and 45 g of the froth control agent were added to the roughing tailing for the first scavenging.

(4) The first scavenging tailing obtained in step (3) was subjected to second scavenging to obtain a second scavenging concentrate and a second scavenging tailing, where the second scavenging tailing was a flotation tailing.

(5) The depressant, the collector, and the froth control agent were added in sequence to the roughing concentrate obtained in step (2), and a resulting mixture was subjected to first cleaning to obtain a first cleaning concentrate and a first cleaning tailing, where in terms of each ton of the argillaceous lepidolite ore, 150 g of the depressant, 55 g of the collector, and 60 g of the froth control agent were added to the roughing concentrate for the first cleaning.

(6) The first cleaning concentrate obtained in step (5) was subjected to second cleaning to obtain lithium concentrate I and a second cleaning tailing.

(7) The first scavenging concentrate obtained in step (3), the second scavenging concentrate obtained in step (4), the first cleaning tailing obtained in step (5), and the second cleaning tailing obtained in step (6) were combined to obtain a lithium-containing mixed middling, and the collector and the froth control agent were added in sequence to the lithium-containing mixed middling. A resulting mixture was subjected to cleaning-scavenging to obtain lithium concentrate II and a cleaning-scavenging tailing, where the cleaning-scavenging tailing was recycled to the second scavenging in step (4). In terms of each ton of the argillaceous lepidolite ore, 40 g of the collector and 50 g of the froth control agent were added to the lithium-containing mixed middling for the cleaning-scavenging.

(8) The lithium concentrate I obtained in step (6) and the lithium concentrate II obtained in step (7) were combined to obtain a lithium concentrate product.

In this example, a flotation recovery of lithium is 85.1%.

Example 2

In this example, tacking a mass of the depressant as 100%, the sodium carbonate accounted for 60% and the sodium silicate accounted for 40%; tacking a mass of the collector as 100%, the laurylamine accounted for 35%, the sodium lauryl sulfonate accounted for 35%, and the ethanol accounted for 30%; tacking a mass of the froth control agent as 100%, the diesel oil accounted for 50%, the polyether accounted for 25%, and the tributyl phosphate accounted for 25%.

As shown in FIGURE, a method for froth-controlled flotation of argillaceous lepidolite ore was performed as follows:

(1) The argillaceous lepidolite ore was crushed and ground until a lepidolite monomer was dissociated, and water was then added thereto to prepare a pulp with a concentration of 33% by mass, where a mass percentage content of $Li_2O$ in the argillaceous lepidolite ore was 0.56%.

(2) The depressant, the collector, and the froth control agent were added in sequence to the pulp obtained in step (1), and a resulting pulp mixture was subjected to roughing to obtain a roughing concentrate and a roughing tailing. For each ton of the argillaceous lepidolite ore, 700 g of the depressant, 440 g of the collector, and 220 g of the froth control agent were added to the pulp for the roughing.

(3) The depressant, the collector, and the froth control agent were added in sequence to the roughing tailing obtained in step (2), and a resulting mixture was subjected to first scavenging to obtain a first scavenging concentrate and a first scavenging tailing. For each ton of the argillaceous lepidolite ore, 300 g of the depressant, 110 g of the collector, and 55 g of the froth control agent were added to the roughing tailing for the first scavenging.

(4) The first scavenging tailing obtained in step (3) was subjected to second scavenging to obtain a second scavenging concentrate and a second scavenging tailing, where the second scavenging tailing was a flotation tailing.

(5) The depressant, the collector, and the froth control agent were added in sequence to the roughing concentrate obtained in step (2), and a resulting mixture was subjected to first cleaning to obtain a first cleaning concentrate and a first cleaning tailing. For each ton of the argillaceous lepidolite ore, 200 g of the depressant, 70 g of the collector, and 70 g of the froth control agent were added to the roughing concentrate for the first cleaning.

(6) The first cleaning concentrate obtained in step (5) was subjected to second cleaning to obtain lithium concentrate I and a second cleaning tailing.

(7) The first scavenging concentrate obtained in step (3), the second scavenging concentrate obtained in step (4), the first cleaning tailing obtained in step (5), and the second cleaning tailing obtained in step (6) were combined to obtain a lithium-containing mixed middling, and the collector and the froth control agent were added in sequence to the lithium-containing mixed middling. A resulting mixture was subjected to cleaning-scavenging to obtain a lithium concentrate II and a cleaning-scavenging tailing, where the cleaning-scavenging tailing was recycled to the second scavenging in step (4). For each ton of the argillaceous lepidolite ore, 50 g of the collector and 60 g of the froth control agent were added to the lithium-containing mixed middling for the cleaning-scavenging.

(8) The lithium concentrate I obtained in step (6) and the lithium concentrate II obtained in step (7) were combined to obtain a lithium concentrate product.

In this example, a flotation recovery of lithium is 86.8%.

Example 3

In this example, tanking a mass of the depressant as 100%, the sodium carbonate accounted for 65% and the water glass accounted for 35%; tacking a mass of the collector as 100%, the laurylamine accounted for 40%, the sodium lauryl sulfonate accounted for 25%, and the ethanol accounted for 35%; tacking a mass of the froth control agent as 100%, the diesel oil accounted for 55%, the polyether accounted for 30%, and the tributyl phosphate accounted for 15%.

As shown in FIGURE, a method for froth-controlled flotation of argillaceous lepidolite ore was performed as follows:

(1) The argillaceous lepidolite ore was crushed and ground until a lepidolite monomer was dissociated, and water was then added thereto to prepare a pulp with a concentration of 37% by mass, where a mass percentage content of $Li_2O$ in the argillaceous lepidolite ore was 0.74%.

(2) The depressant, the collector, and the froth control agent were added in sequence to the pulp obtained in step (1), and a resulting pulp mixture was subjected to roughing to obtain a roughing concentrate and a roughing tailing. For each ton of the argillaceous lepidolite ore, 850 g of the depressant, 520 g of the collector, and 260 g of the froth control agent were added to the pulp for the roughing.

(3) The depressant, the collector, and the froth control agent were added in sequence to the roughing tailing obtained in step (2), and a resulting mixture was subjected to first scavenging to obtain a first scavenging concentrate and a first scavenging tailing. For each ton of the argillaceous lepidolite ore, 350 g of the depressant, 130 g of the collector, and 65 g of the froth control agent were added to the roughing tailing for the first scavenging.

(4) The first scavenging tailing obtained in step (3) was subjected to second scavenging to obtain a second scavenging concentrate and a second scavenging tailing, where the second scavenging tailing was a flotation tailing.

(5) The depressant, the collector, and the froth control agent were added in sequence to the roughing concentrate obtained in step (2), and a resulting mixture was subjected to first cleaning to obtain a first cleaning concentrate and a first cleaning tailing. For each ton of the argillaceous lepidolite ore, 250 g of the depressant, 85 g of the collector, and 80 g of the froth control agent were added to the roughing concentrate for the first cleaning.

(6) The first cleaning concentrate obtained in step (5) was subjected to second cleaning to obtain lithium concentrate II and a second cleaning tailing.

(7) The first scavenging concentrate obtained in step (3), the second scavenging concentrate obtained in step (4), the first cleaning tailing obtained in step (5), and the second cleaning tailing obtained in step (6) were combined to obtain a lithium-containing mixed middling, and the collector and the froth control agent were added in sequence to the lithium-containing mixed middling. A resulting mixture was subjected to cleaning-scavenging to obtain lithium concentrate II and a cleaning-scavenging tailing, where the cleaning-scavenging tailing was recycled to the second scavenging in step (4). For each ton of the argillaceous lepidolite ore, 60 g of the collector and 70 g of the froth control agent were added to the lithium-containing mixed middling for the cleaning-scavenging.

(8) The lithium concentrate I obtained in step (6) and the lithium concentrate II obtained in step (7) were combined to obtain a lithium concentrate product.

In this example, a flotation recovery of lithium is 88.3%.

The embodiments of the present disclosure have been described in detail above, but the present disclosure is not limited to the above embodiments. Various changes can be made without departing from the concept of the present disclosure within the range of knowledge possessed by those of ordinary skill in the art.

What is claimed is:

1. A method for froth-controlled flotation of argillaceous lepidolite ore, comprising the following steps:

(1) crushing and grinding a lepidolite ore until a lepidolite monomer is dissociated, and adding water to obtain a pulp having a concentration of 29% to 37% by mass;

(2) adding a depressant, a collector, and a froth control agent in sequence to the pulp obtained in step (1), and conducting roughing to obtain a roughing concentrate and a roughing tailing;

(3) adding the depressant, the collector, and the froth control agent in sequence to the roughing tailing obtained in step (2), and conducting first scavenging to obtain a first scavenging concentrate and a first scavenging tailing;

(4) subjecting the first scavenging tailing obtained in step (3) to second scavenging to obtain a second scavenging concentrate and a second scavenging tailing, the second scavenging tailing being a flotation tailing;

(5) adding the depressant, the collector, and the froth control agent in sequence to the roughing concentrate obtained in step (2), and conducting first cleaning to obtain a first cleaning concentrate and a first cleaning tailing;

(6) subjecting the first cleaning concentrate obtained in step (5) to second cleaning to obtain lithium concentrate I and a second cleaning tailing;

(7) combining the first scavenging concentrate obtained in step (3), the second scavenging concentrate obtained in step (4), the first cleaning tailing obtained in step (5), and the second cleaning tailing obtained in step (6) to obtain a lithium-containing mixed middling, adding the collector and the froth control agent in sequence to the lithium-containing mixed middling, and conducting cleaning-scavenging to obtain lithium concentrate II and a cleaning-scavenging tailing, wherein the cleaning-scavenging tailing is recycled to the second scavenging in step (4); and (8) combining the lithium concentrate I obtained in step (6) and the lithium concentrate II obtained in step (7) to obtain a lithium concentrate product, wherein the depressant is a mixture of sodium carbonate and a water glass, the collector is a mixture of laurylamine, sodium lauryl sulfonate, and ethanol, and the froth control agent is a mixture of diesel oil, a polyether, and tributyl phosphate.

2. The method for the froth-controlled flotation of the argillaceous lepidolite ore according to claim 1, wherein in step (1), a mass percentage content of $Li_2O$ in the argillaceous lepidolite ore is in a range of 0.38% to 0.74%.

3. The method for the froth-controlled flotation of the argillaceous lepidolite ore according to claim 1, wherein in terms of each ton of the argillaceous lepidolite ore, 550 g to 850 g of the depressant, 360 g to 520 g of the collector, and 180 g to 260 g of the froth control agent are added for conducting the roughing in step (2).

4. The method for the froth-controlled flotation the argillaceous lepidolite ore according to claim 1, wherein in terms of each ton of the argillaceous lepidolite ore, 250 g to 350 g of the depressant, 90 g to 130 g of the collector, and 45 g to 65 g of the froth control agent are added for conducting the first scavenging in step (3).

5. The method for the froth-controlled flotation the argillaceous lepidolite ore according to claim 1, wherein in terms of each ton of the argillaceous lepidolite ore, 150 g to 250 g of the depressant, 55 g to 85 g of the collector, and 60 g to 80 g of the froth control agent are added for conducting the first cleaning in step (5).

6. The method for the froth-controlled flotation the argillaceous lepidolite ore according to claim 1, wherein in terms of each ton of the argillaceous lepidolite ore, 40 g to 60 g of the collector and 50 g to 70 g of the froth control agent are added for conducting the cleaning-scavenging in step (7).

7. The method for the froth-controlled flotation the argillaceous lepidolite ore according to claim 1, wherein taking a mass of the depressant as 100%, the sodium carbonate accounts for 55% to 65% and the water glass accounts for 35% to 45%;

taking a mass of the collector as 100%, the laurylamine accounts for 30% to 40%, the sodium lauryl sulfonate accounts for 25% to 35%, and the ethanol accounts for 30% to 40%; and taking a mass of the froth control agent as 100%, the diesel oil accounts for 45% to 55%, the polyether accounts for 25% to 35%, and the tributyl phosphate accounts for 15% to 25%.

* * * * *